No. 787,385. Patented April 18, 1905.

UNITED STATES PATENT OFFICE.

HERMAN LENZ, OF PHILADELPHIA, PENNSYLVANIA.

INSECTICIDE.

SPECIFICATION forming part of Letters Patent No. 787,385, dated April 18, 1905.

Application filed August 8, 1904. Serial No. 219,822.

*To all whom it may concern:*

Be it known that I, HERMAN LENZ, a subject of the Emperor of Germany, residing at Philadelphia, in the county of Philadelphia and State of Pennsylvania, have invented a new and useful Composition of Matter to be Used for the Eradication and Destruction of All Manner of Vermin, Including Rats, Mice, Insects, and the Like, of which the following is a specification.

My composition consists of the following ingredients, combined in the proportions stated, viz: milk, fresh, two fluid ounces; turpentine, one fluid ounce; gasolene, three-fourths of a fluid ounce; creoline, one-fourth of a fluid ounce; oil of wintergreen, one-eighth of a fluid ounce; formaline, five drops; tartaric acid, one-half of an ounce; flowers of sulfur, one-eighth of an ounce. These ingredients are to be thoroughly mingled by agitation.

In using the above composition it should be thoroughly agitated and applied by a brush or simple form of atomizer to all the cracks and crevices on the premises infested by the vermin.

While this composition is effectual in ridding the premises where it is applied of such pests by causing their death, it is not dangerously poisonous to human beings except in greater quantities than is presumable to be of ready access.

I am aware that preparations consisting of gasolene, turpentine, and sulfur have been used for the same purpose; but I am not aware that all the ingredients of my composition have been used together.

What I claim, and desire to secure by Letters Patent of the United States, is—

1. The herein-described composition of matter, consisting of milk, turpentine, gasolene, creoline, oil of wintergreen, formaline, tartaric acid and sulfur, substantially as described and for the purpose specified.

2. The herein-described composition of matter for a vermicide, consisting of milk, two fluid ounces, turpentine, one fluid ounce, gasolene, three-fourths of a fluid ounce, creoline, one-fourth of a fluid ounce, oil of wintergreen, one-eighth of a fluid ounce, formaline, five drops, tartaric acid, one-half ounce, flowers of sulfur, one-eighth ounce, substantially as described.

In testimony whereof I have signed my name to this specification in the presence of two subscribing witnesses.

HERMAN LENZ.

Witnesses:
 CHARLES HAMM,
 FRANK E. BONSER.